(12) United States Patent
Li et al.

(10) Patent No.: US 8,387,009 B2
(45) Date of Patent: Feb. 26, 2013

(54) POINTER RENAMING IN WORKQUEUING EXECUTION MODEL

(75) Inventors: Wenlong Li, Beijing (CN); Eric Li, Beijing (CN)

(73) Assignee: Intel Corporation, Santa Clara, CA (US)

(*) Notice: Subject to any disclaimer, the term of this patent is extended or adjusted under 35 U.S.C. 154(b) by 1704 days.

(21) Appl. No.: 11/712,171

(22) Filed: Feb. 28, 2007

(65) Prior Publication Data

US 2008/0163216 A1    Jul. 3, 2008

Related U.S. Application Data

(63) Continuation of application No. PCT/CN2006/003614, filed on Dec. 27, 2006.

(51) Int. Cl.
G06F 9/44    (2006.01)
G06F 9/45    (2006.01)
G06F 9/46    (2006.01)

(52) U.S. Cl. .................. 717/119; 717/149; 718/100

(58) Field of Classification Search .................. None
See application file for complete search history.

(56) References Cited

U.S. PATENT DOCUMENTS

| | | | |
|---|---|---|---|
| 6,466,898 B1* | 10/2002 | Chan | 703/17 |
| 2004/0172626 A1* | 9/2004 | Jalan et al. | 717/149 |
| 2006/0236011 A1* | 10/2006 | Narad et al. | 710/240 |
| 2007/0130568 A1* | 6/2007 | Jung et al. | 718/104 |

OTHER PUBLICATIONS

Hadjidoukas et al., "OpenMP for Adaptive Master-Slave Message Passing Applications," Springer-Verlag Berlin Heidelberg, 2003.*
Su et al., "Compiler Support of the Workqueuing Execution Model for Intel_ SMP Architectures," European workshop, 2002, caspur.it.*
Chen et al., "Towards efficient multi-level threading of H. 264 encoder on Intel hyper-threading architectures," IEEE, 2004.*
Chen et al., "Exploring the use of Hyper-Threading technology for multimedia applications with Intel® OpenMP compiler," IEEE, 2003.*
Sato et al., "Design of OpenMP Compiler for an SMP Cluster," Workshop on OpenMP, 1999.*
Liu, "Improving the Performance of OpenMP by Array Privatization," 2002.*
Soukup, "A Source-to-Source OpenMP Compiler," Aug. 2001.*

* cited by examiner

*Primary Examiner* — Insun Kang
(74) *Attorney, Agent, or Firm* — Ryder, Lu, Mazzeo and Konieczny, LLC; Douglas J. Ryder

(57) ABSTRACT

In general, in one aspect, the disclosure describes a method that includes initializing a queue for a master thread. A cyclic pointer buffer is created based on heap variables in arguments in the master thread. At least one heap variable is passed from the master thread to a slave thread. A pointer for the master thread is exchanged with a pointer for an entry in the buffer. The entry in the buffer is indicated as being available for processing by the slave thread.

20 Claims, 16 Drawing Sheets

```
1    void test() {
2       #pragma xxx omp parallel taskq shared(p1, p2, p3, p4)
3       {
4          while (p1 != NULL && p2 != NULL && p3 != NULL && p4 != NULL)
5          {
6             save_data_to(p1);
7             save_data_to(p2);
8             save_data_to(p3);
9             save_data_to(p4);
10            #pragma xxx omp task captureprivate(p1, p2, p3, p4)
     pointer_renaming(p1, p2, p3, p4)
11            {
12               ...
13               do_work(p1);
14               do_work(p3);
15               do_work(p4);
16               do_work(p2);
17               ...
18            }
19         }
20      }
21   }
```

```
1  public void videomining()
2  {
3    CImageObject *pImageObject = new CImageObject();
4    #pragma xxx omp parallel taskq shared(pImageObject)
5    while (not end of video)
6    {
7      decoding_video(pImageObject);
8      #pragma xxx omp task captureprivate(pImageObject)
pointer_renaming(pImageObject);
9        extract_feature(pImageObject);
10   }
11   delete pImageObject;
12 }
```

FIG. 1

```
1   void test() {
2   #pragma xxx omp parallel taskq shared(p1, p2, p3, p4)
3   {
4       while (p1 != NULL && p2 != NULL && p3 != NULL && p4 != NULL)
5       {
6           save_data_to(p1);
7           save_data_to(p2);
8           save_data_to(p3);
9           save_data_to(p4);
10          #pragma xxx omp task captureprivate(p1, p2, p3, p4)
    pointer_renaming(p1, p2, p3, p4)
11          {
12              ...
13              do_work(p1);
14              do_work(p3);
15              do_work(p4);
16              do_work(p2);
17              ...
18          }
19      }
20  }
21  }
```

FIG. 2

| | |
|---|---|
| | CImageObject *p1 = new CImageObject(); |
| | CImageObject *p2 = new CImageObject(); |
| | CImageObject *p3 = new CImageObject(); |
| | CImageObject *p4 = new CImageObject(); |
| | CImageObject *p5 = new CImageObject(); |
| | CImageObject *p6 = new CImageObject(); |
| | CImageObject *p7 = new CImageObject(); |
| | CImageObject *p8 = new CImageObject(); |

| | |
|---|---|
| P1 | NULL |
| P2 | NULL |
| P3 | NULL |
| P4 | NULL |
| P5 | NULL |
| P6 | NULL |
| P7 | NULL |
| P8 | NULL |

*FIG. 6A*

| P0 | READING |
| P1 | READING |
| P2 | READING |
| P3 | READY |
| P4 | READY |
| P5 | READY |
| P6 | READY |
| P7 | READY |

| P8 | THE POINTER IN MASTER THREAD |

*FIG. 6F*

| P0 | P1 | P2 | P3 | P4 | P5 | P6 | P7 |
|---|---|---|---|---|---|---|---|
| READING | READING | READING | READING | READY | READY | READY | READY |

| P8 |
|---|
| THE POINTER IN MASTER THREAD IS SAVED |

*FIG. 6G*

| P0 | NULL |
| P1 | READING |
| P2 | READING |
| P3 | READING |
| P4 | READY |
| P5 | READY |
| P6 | READY |
| P7 | READY |

| P8 | THE POINTER IN MASTER THREAD IS SAVED |

*FIG. 6H*

POINTER RENAMING IN WORKQUEUING EXECUTION MODEL

RELATED APPLICATION

This is a continuation of International Application PCT/CN06/03614, with an international filing date of Dec. 27, 2006, entitled POINTER RENAMING IN WORKQUEUING EXECUTION MODEL, the entire contents of which are hereby incorporated by reference.

BACKGROUND

Symmetric multiprocessing (SMP) is a computer architecture that provides fast performance by making multiple CPUs available to complete individual processes simultaneously (multiprocessing). Any idle processor can be assigned any task, and additional CPUs can be added to improve performance and handle increased loads. A chip multiprocessor (CMP) includes multiple processor cores on a single chip, which allows more than one thread to be active at a time on the chip. A CMP is SMP implemented on a single integrated circuit. Thread-level parallelism (TLP) is the parallelism inherent in an application that runs multiple threads at once. A goal of CMP is to allow greater utilization of TLP.

Parallel programming languages (e.g., OpenMP, TBB, CILK) are used for writing multithreaded applications. The tasks to be performed in a multithreaded application may have well defined tasks to be performed in parallel (parallelism) so that different cores can be assigned different tasks. However, the tasks to be performed may exhibit irregular parallelism (e.g., operate on tree-based dynamic structures). Workqueuing is identification of tasks that can be performed in parallel and the queuing of these tasks. The tasks queued may then be dequeued and processed by processor cores having available processing power. The workqueuing execution enables a user to exploit irregular parallelism among dynamic data structures. Workqueuing is an effective technique to achieve high scalability performance for large number of processors.

In OpenMP, the workqueuing model is supported by taskq and task pragmas. The taskq pragma specifies the environment within which the enclosed units of work (tasks) are to be executed and the task pragma specifies the unit of work (task). When a taskq pragma is encountered a master thread initializes a queue based on the taskq pragma and executes the code within a taskq block serially. When a task pragma is encountered it conceptually adds the task to the queue created by the master thread. A captureprivate clause may be used ensure that a private copy of the link pointer is captured at the time each task is being enqueued. Slave threads dequeue the tasks from the queue and execute them.

In case of data dependence existing between master and slave threads, a value (heap variable) from a master thread (value producer) may need to be passed to a worker thread (value consumer). To avoid the value being overwritten by the master thread before the previous data is actually used by a slave thread, a memory copy operation may be used for passing the value from the master to the slave. The memory copy operation copies the data from a master thread to a slave thread to ensure that master and slave threads operate on different memory location. However, if excessive memory copy operations are performed, bus bandwidth to the shared CMP/SMP memory hierarchy can become saturated. Saturated bus bandwidth may lead to the memory copying experiencing high performance penalty.

Another possible approach for passing the value between master and slave threads is by having the master thread allocate memory space for each task. The master thread saves the data to these memory locations for later use by the slave threads. The slave threads read data from associated memory locations, perform computations on the data, and then deallocate the memory space after completion of the computation. This approach requires frequent memory allocation/deallocation operations, which causes poor memory system performance in the CMP/SMP memory hierarchy.

BRIEF DESCRIPTION OF THE DRAWINGS

The features and advantages of the various embodiments will become apparent from the following detailed description in which:

FIG. 1 illustrates an example video mining multithreaded application, according to one embodiment;

FIG. 2 illustrates an example multithreaded multi heap variable application, according to one embodiment;

FIGS. 6A-I illustrate an example execution of the video mining application of FIG. 1, according to one embodiment;

DETAILED DESCRIPTION

Figure 3:
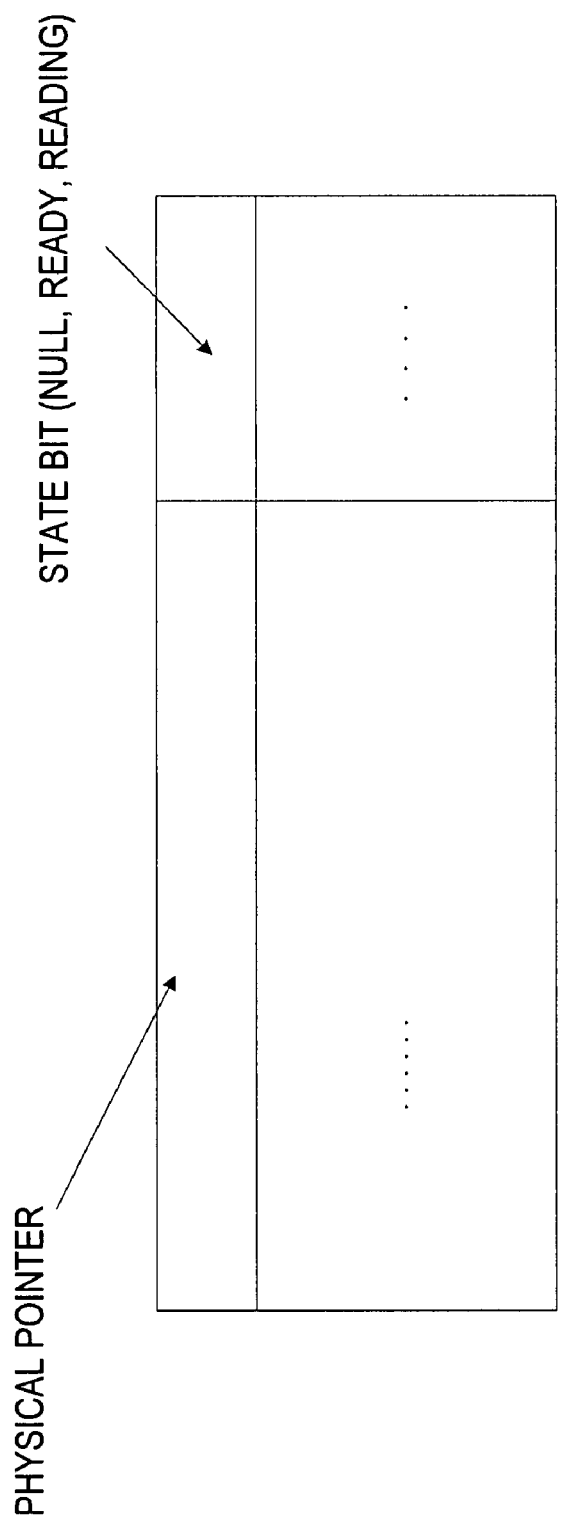
FIG. 3 illustrates an example of cyclic pointer buffer that would be created for the multithreading application of FIG. 1, according to one embodiment.

When slave threads in a multithreading application are dependent upon data from a master thread the data needs to be made available to the slave threads so the slave threads can use the data before the data is possibly overwritten by the master thread. The data can be made available to the slave threads by having the master thread allocate memory space for the slave threads. That is, the memory may hold data captured by the master thread for use by the slave threads. The size of the memory space may be based on the number of threads that may be performing parallel tasks. For example, if four threads may be performing parallel tasks the memory space may include eight addresses for storing data to allow for pipelined operations.

The pointers to the memory locations may be dynamically renamed in order to pass the arguments for heap variables to the slave threads. In order to carry out argument passing via pointer renaming for parallel programming languages (e.g., OpenMP, TBB, CILK) with workqueuing model, an associated compiler and library may be required to provide support. The pointer renaming may be performed automatically during execution (run-time) and be managed by the library. The run time library may be responsible for mapping virtual pointers to the physical pointers. The application of pointer renaming may be transparent to programmers.

A workqueuing parallel programming language compiler may need to be modified so that it identifies heap variables in arguments being passed from master thread to slave threads and inserts hint information recording the number of heap variables and their data type. It determines the first use and last use instructions for these variables in the task through data dependence analysis, which is easily done in the compiler. The compiler then inserts a first specific instruction before first use of heap variables and a second specific instruction after last use of heap variables. The first specific instruction marks the pointer as a logic pointer (determination of a physical pointer associated therewith is determined at runtime and is discussed with respect to the runtime library actions). The second specific instruction is to set the state of entry to null to indicate all computations on the memory data have been completed, and this physical pointer is available for writing new data into the memory pointed by it.

FIG. 1 illustrates an example video mining multithreaded application written with an OpenMP workqueing model. Video mining includes decoding and feature extraction. The decoding of a video frame is dependent on relationship between consecutive frames so is performed in serial (can't be performed in parallel). The feature extraction of decoded video frames is independent and so feature extraction can be performed in parallel. Accordingly, decoding (statement 7) is performed within the taskq pragma (statement 4) and becomes the master thread. The extraction (statement 9) is performed within the task pragma (statement 8) so slave threads may perform feature extraction of different decoded frames in parallel.

It should be noted that the xxx after pragma in FIG. 1 indicates a library associated with a specific OpenMP (omp) compiler. For example, the library may be an Intel omp library for working with their Intel SMP compiler (e.g., the xxx may be intel).

The compiler will identify that there is one heap variable (pImageObject) and will insert hint information regarding the fact that there is one heap variable and it's data type is CImageObject. The compiler will then determine that first and only use of the heap variable is for the extraction (statement 9). Accordingly, the compiler puts the first specific instruction before statement 9 and the second specific instruction after statement 9.

FIG. 2 illustrates an example multithreaded application with 4 heap variables written with an OMP workqueing model. The compiler easily identifies the 4 heap variables (p1, p2, p3, p4) and inserts hint information for 4 variables and data type associated therewith, identifies the first-use of a heap variable in statement 13 and a last use in statement 16 and adds the first and second specific instructions before statement 13 and after statement 16 respectively.

A workqueuing parallel programming language library may need to be modified to perform a series of actions at runtime. First, when encountering the taskq pragma a master thread needs to initialize a queue and create a cyclic pointer buffer based on the hint information for the number of heap variables and their data types passed from compiler. The buffer size is equal to the task queue size, so when the queue is full the buffer is also full. The buffer captures a pointer to a memory location in the queue where the data is stored and a state bit representing a current status of the entry. The states of the entry may be null, ready and reading and will be defined in more detail later. Initially, each entry is initialized with a pointer of same type as the passed argument and a null state (meaning data can be written thereto or is available for tasking). The pointer in each entry is captured by invoking the same construction function used to capture the pointer in the master thread.

FIG. 3 illustrates an example of cyclic pointer buffer that would be created for the multithreaded application of FIG. 1. Each entry in the buffer has a pointer to the memory location for the heap variable and a state bit. If we maintain 4 states (null, ready, reading, writing) 2 bits are enough to indicate the status.

Figure 4:
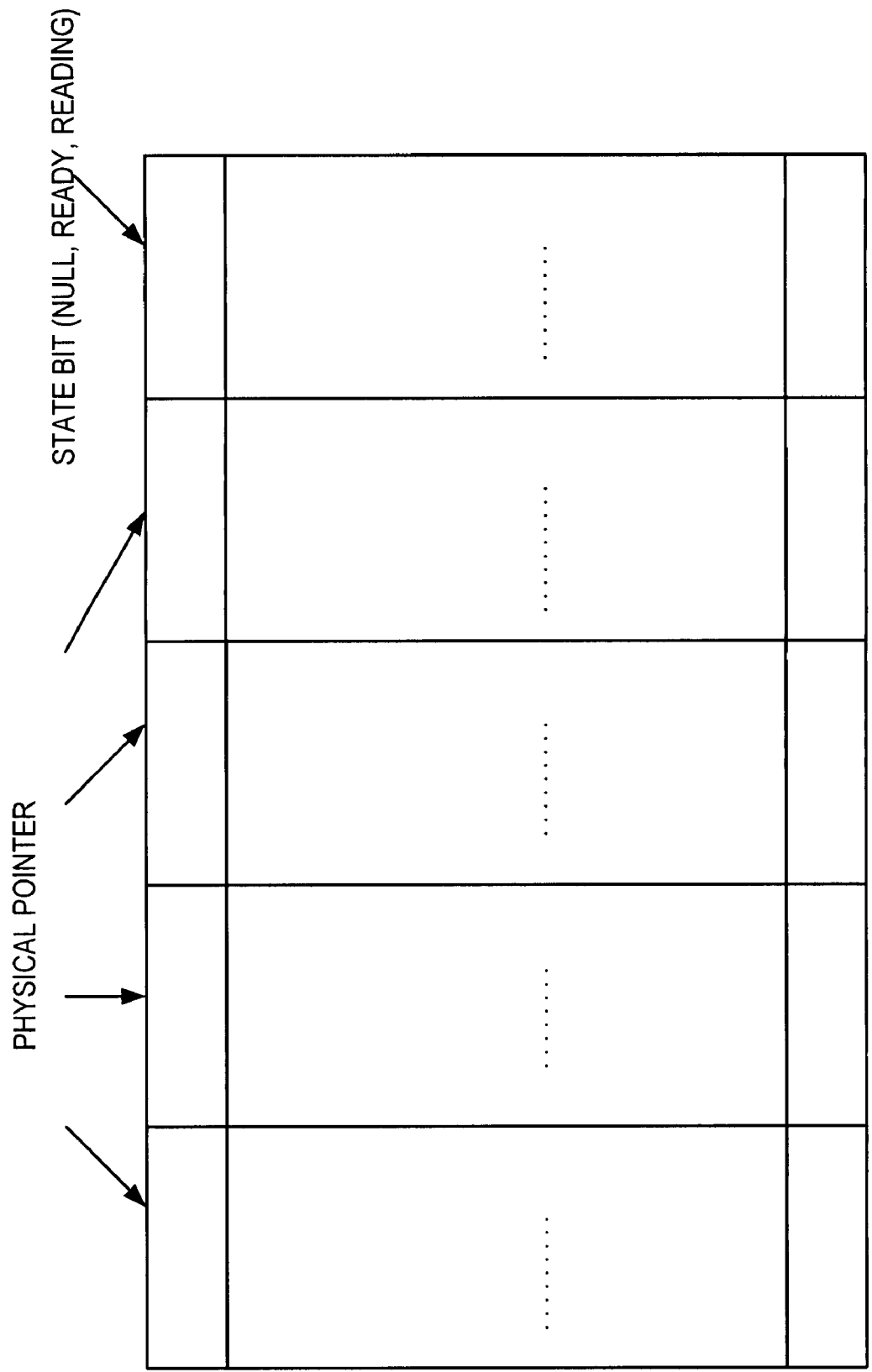
FIG. 4 illustrates an example of cyclic pointer buffer that would be created for the multithreading application of FIG. 2, according to one embodiment.

FIG. 4 illustrates an example of cyclic pointer buffer that would be created for the multithreading application of FIG. 2. Each entry in the buffer includes four pointers to the memory location for the four heap variables (each heap variable has one pointer, so there are four pointers) and a state bit.

When the runtime library passes a heap variable (pointer) from the master thread to a slave thread through some dedicated clause, the pointer of the master thread is exchanged with a pointer for an entry in the buffer having a null state (the pointers are dynamically renamed). The state value for the entry in the buffer is changed to ready indicating that it is ready for later use by a slave thread (is available for processing). Since the master thread had its pointer renamed to another value, in next iteration, the master thread will save data to another memory location and avoid the value overwriting to same memory area. The dedicated clause may be a captureprivate clause that is typically used to capture the pointer modified to also perform the pointer renaming thus not requiring any programming modification on the part of a user. Alternatively, the captureprivate may remain the same and a new clause (e.g., pointer-renaming) may be used to initiate the pointer renaming feature. This alternative would enable a user to option of when to initiate this feature. It should be noted that FIGS. 1 and 2 illustrate the task pragma having both captureprivate and pointer-renaming clauses.

When the runtime library encounters the first specific instruction and initiates a slave thread it will go through the cyclic pointer buffer to search for an entry with ready state (the memory data is available). After finding such an entry in the buffer, the runtime library will associate the logical pointer in the slave thread with the physical pointer for that entry and will change the state of that entry in the buffer to reading. Setting the state in the buffer to reading indicates a thread is using this pointer and thus is not available for other threads to use.

When the runtime library completes a slave thread and executes the second specific instruction, the state value of the entry containing this pointer is set to null indicating that the pointer in this entry is not in use and new data can be written to the associated memory location referenced by the pointer in this entry.

Figure 5:
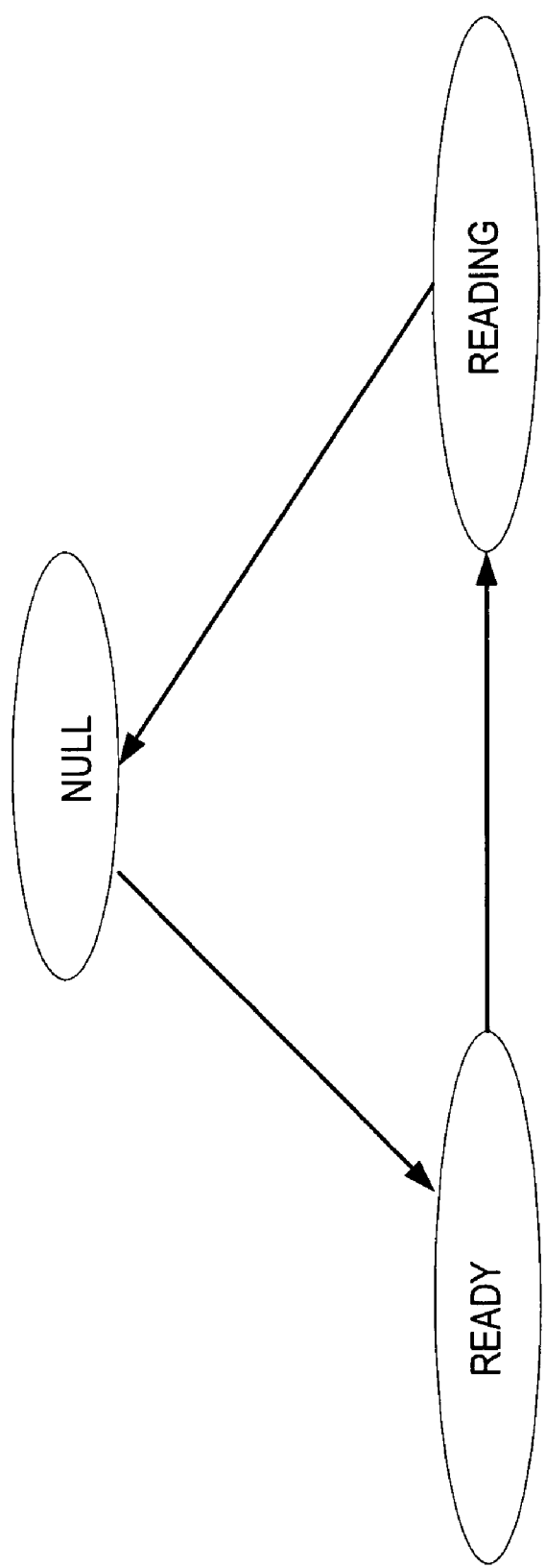
FIG. 5 illustrates an example state transition graph for each entry in a cyclic pointer buffer, according to one embodiment.

FIG. 5 illustrates an example state transition graph for each entry in the cyclic pointer buffer. Each entry is initialized with a null state. The state for an entry is changed to ready when the entry is filled with a new valid value (physical pointer). That is, when the physical pointer for an entry in the buffer is renamed to a new physical pointer from the master. When the pointer is being used by a slave thread to perform computations on the memory data its state is set to reading. After the slave thread completes the computations the state goes back to null state. The process repeats until exiting the taskq pragma. When the taskq pragma is completed the runtime library is responsible for releasing the memory associated with queue and pointer buffer to avoid memory leakage.

Figure 6B:
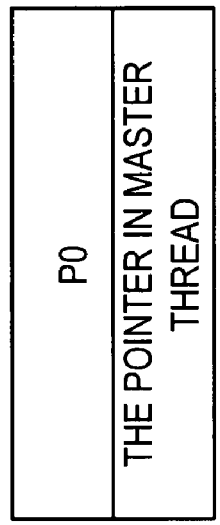

FIGS. 6A-I illustrate an example execution of the video mining application of FIG. 1 for a four processor SMP with four threads initialized for the parallel region. FIG. 6A (left side) illustrates a cyclic pointer buffer that would be created by a master thread after encountering the taskq pragma and receiving hints from the compiler. The cyclic pointer buffer has eight entries with each entry having a pointer associated therewith (pointer simply illustrated as p1-p8 for ease) and being assigned a null state. The pointers are of the data type illustrated in the table on the right based on the hints from the compiler.

FIG. 6B illustrates the master thread having a pointer assigned thereto. In this example, the master thread decodes a video frame and saves the decoded video frame to memory identified by the pointer for processing by one of a plurality of parallel slave threads. For ease of discussion assume the pointer value is p0.

Figure 6C:
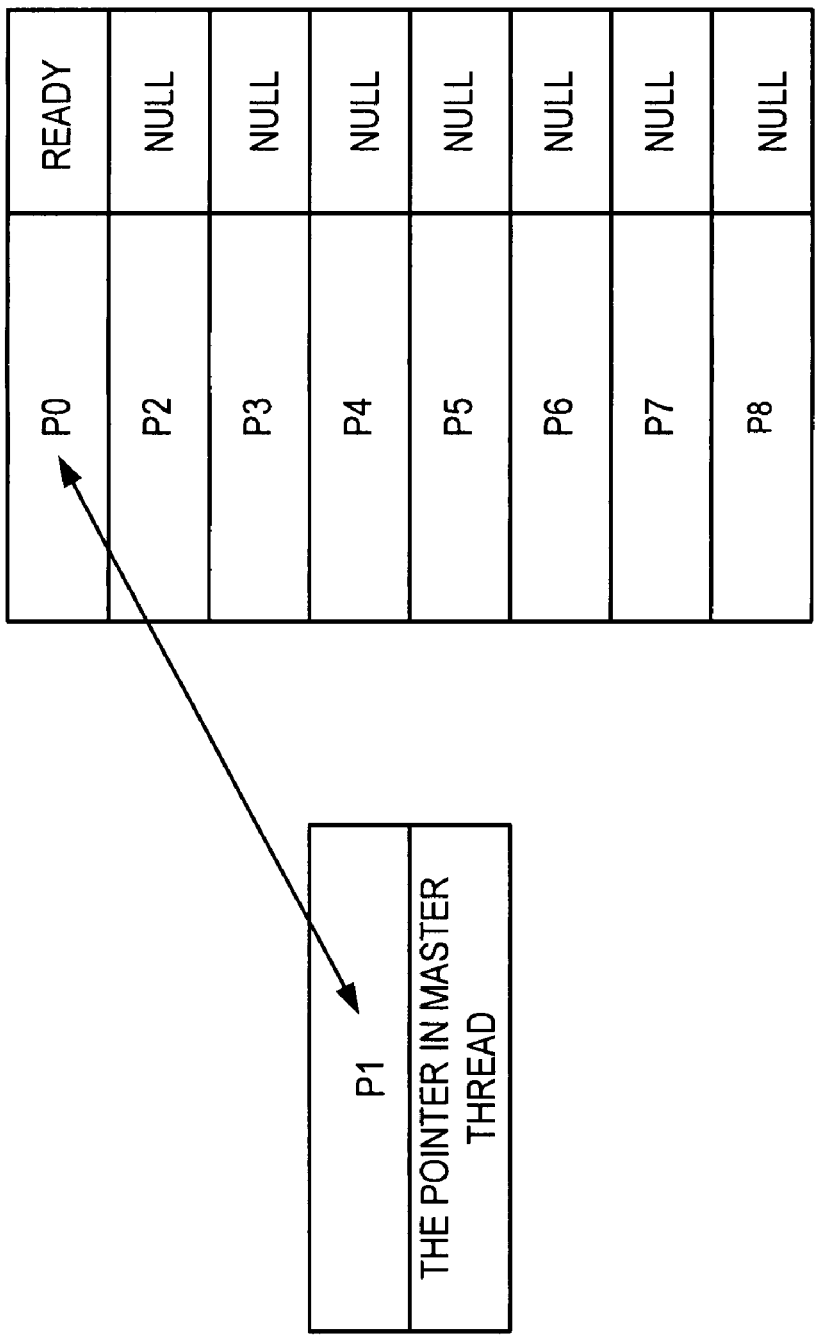

FIG. 6C illustrates the pointer value for the master thread and the pointer value for the first entry in the buffer being switched (renamed) and the new pointer value for the first entry in the buffer being set to ready. The master thread encountered the task pragma so it enqueued a task and found the first entry in the cyclic pointer buffer with a null state (first entry) and exchanged the pointer in the master thread with the pointer in first entry and then set the state for the first entry to ready. In this case the pointer in master thread is renamed to p1 and the pointer in the first entry of the cyclic pointer buffer is renamed to p0 and the state of this entry (p0) is set to ready.

Figure 6D:
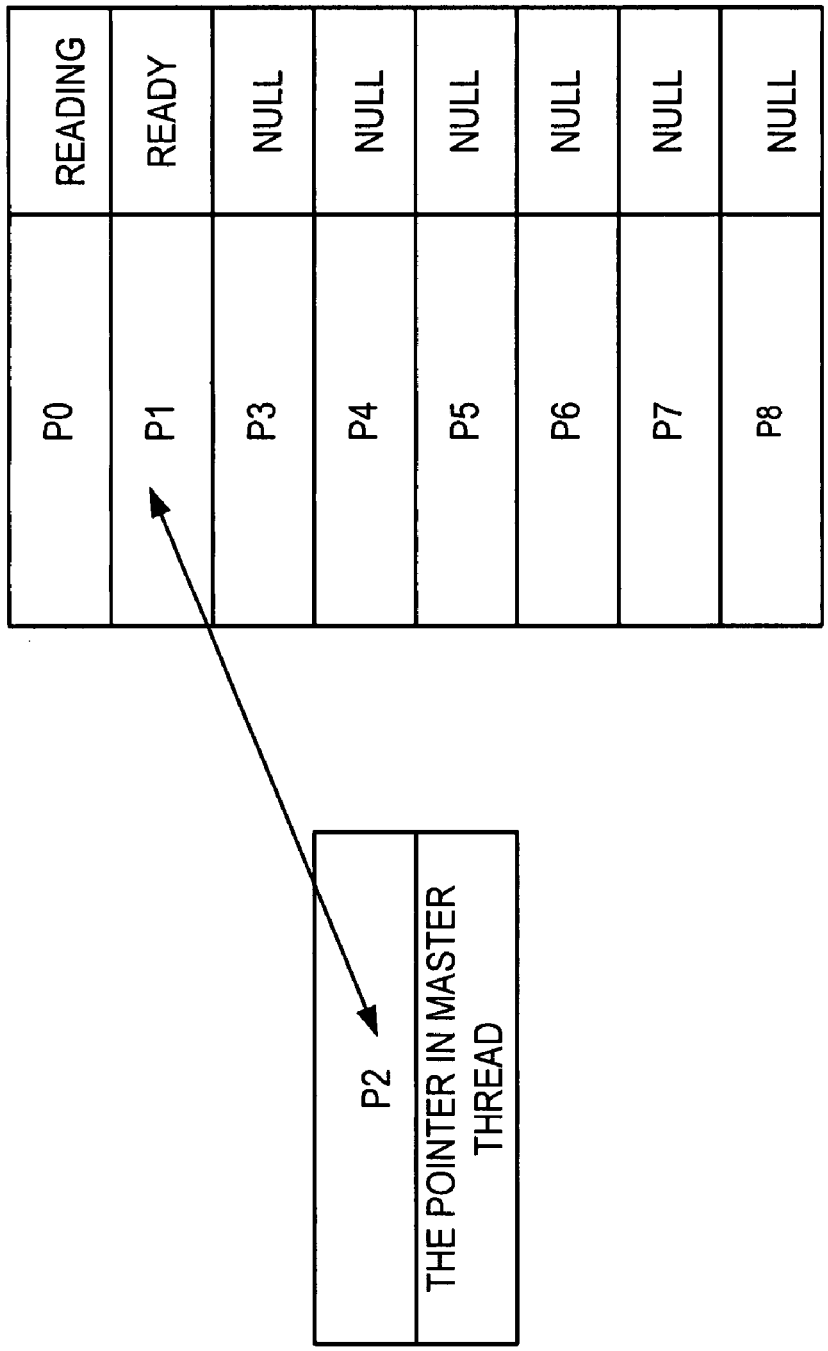

FIG. 6D illustrates the first entry in the buffer being set to reading and the master pointer and the pointer for the second entry being switched and the new pointer value for the second entry in the buffer being set to ready. Since one task is available in queue (first entry), one slave thread is woken and dequeues the task for execution. When encountering the first specific instruction before feature extraction statement, the run time library goes through the pointer buffer and finds an entry with ready state (first entry) and sets the logical pointer pImageObject in slave thread to the physical pointer (p0) in the found entry and modifies the state of that entry (first entry) to reading. At the same time, master thread is executing in parallel with this slave thread and enqueues a new task and finds the first entry in the cyclic pointer buffer with a null state (second entry) and exchanges the pointer in master thread with the pointer in second entry and then sets the state of the second entry to ready. In this case the pointer in master thread is renamed to p2, the pointer in the second entry of the cyclic pointer buffer is renamed to p1 and has it's state set to ready, and the state of the first entry (p0) is set to reading.

Figure 6E:
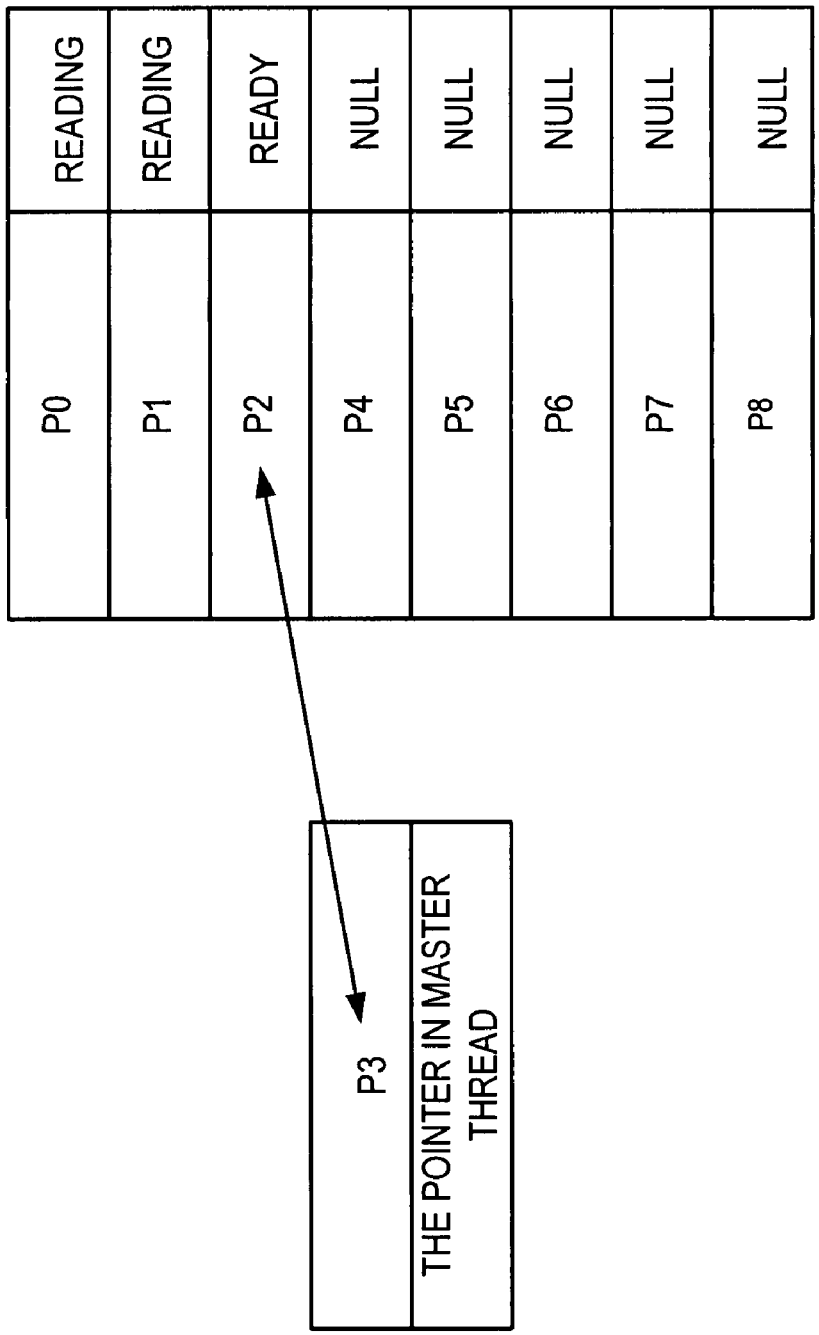

FIG. 6E illustrates the second entry in the buffer being set to reading and the master pointer and the pointer for the third entry being switched and the new pointer value for the third entry in the buffer being set to ready. Since a new task is put into the queue (second entry), a new slave thread is woken up to execute the task. The runtime library goes through the pointer buffer and finds the second entry having a ready state, utilizes the pointer for the second entry to perform computation, and sets the state of the second entry to reading. In parallel, the master thread enqueues a new task and exchanges pointers with the third entry and sets the third entry to ready. In this case the pointer in master thread is renamed to p3, the pointer in the third entry of the cyclic pointer buffer is renamed to p2 and has it's state set to ready, and the state of the second entry (p1) is set to reading.

FIG. 6F illustrates the buffer being full after more tasks are put into the queue and pointers are saved into the cyclic pointer buffer. As illustrated the master thread pointer is p8, the entries in the buffer range from p0-p7, with p0-p2 reading (all three slave threads are processing) and p3-p7 are ready for processing. Since the buffer is full the queue will also be full and the master thread stops its execution. The master thread may now take a task from the queue to execute just like the slave threads. That is, the master thread may become a slave thread.

FIG. 6G illustrates the pointer for the master thread (p8) being saved for later use and the fourth entry in the buffer being set to ready. The thread that was performing the master thread functions begins performing slave thread functions. The next entry in buffer with a ready state is found (entry three having pointer p3), the task associated therewith is dequeued, the logical pointer for the thread is associated with the physical pointer, and the state of that entry in the buffer is set to reading. In this case the pointer (p8) associated with the master thread is saved, and the state of the fourth entry (p3) is set to reading.

FIG. 6H illustrates a first entry in the buffer being set to null. When one thread completes the computations on the pointer variable and executes the second specific instruction it will set the state of entry containing this pointer to null. In this case the slave thread that was working on the first entry (e.g., the first slave thread) finished its computation and executed the second specific instruction which set the state of the first entry in the pointer buffer to null.

Figure 6I:
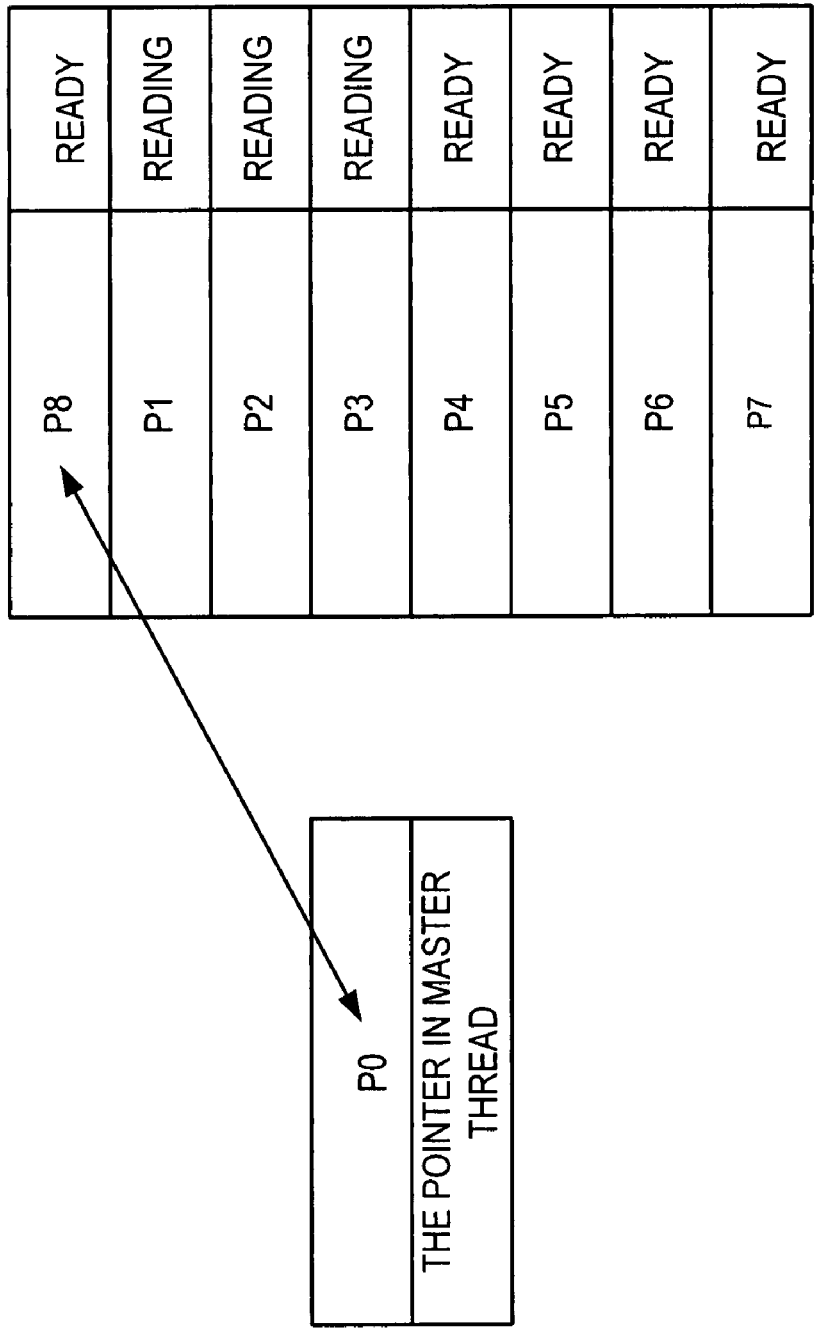

FIG. 6I illustrates the pointer value for the master thread and the pointer value for the first entry in the buffer being switched (renamed) and the new pointer value for the first entry in the buffer being set to ready. The first entry was null meaning that there is available space in the task queue and that the master thread could again complete a task (fill the queue and update the buffer). The previous master thread is now a slave thread working on the fourth entry (p3) so the first slave thread takes the role of the master thread. The new master thread retrieves the value of master thread pointer (p8) and enqueues the task by exchanging the pointer in the master thread with the pointer in first entry and setting the state for the first entry to ready. In this case the pointer in master thread is renamed to p0 and the pointer in the first entry of the cyclic pointer buffer is renamed to p8 and the state of this entry (p8) is set to ready.

The process described above in FIG. 6 will continue until the end of the taskq pragma (e.g., until the end of the decoding by master thread and feature extraction by slave threads). It should be noted that once the queue is filled that the original master thread becomes a slave thread and then once the queue becomes open again that another thread (slave thread) becomes the master thread to fill the queue. Once the queue becomes filled again the new master thread becomes a slave thread again.

Figure 7:
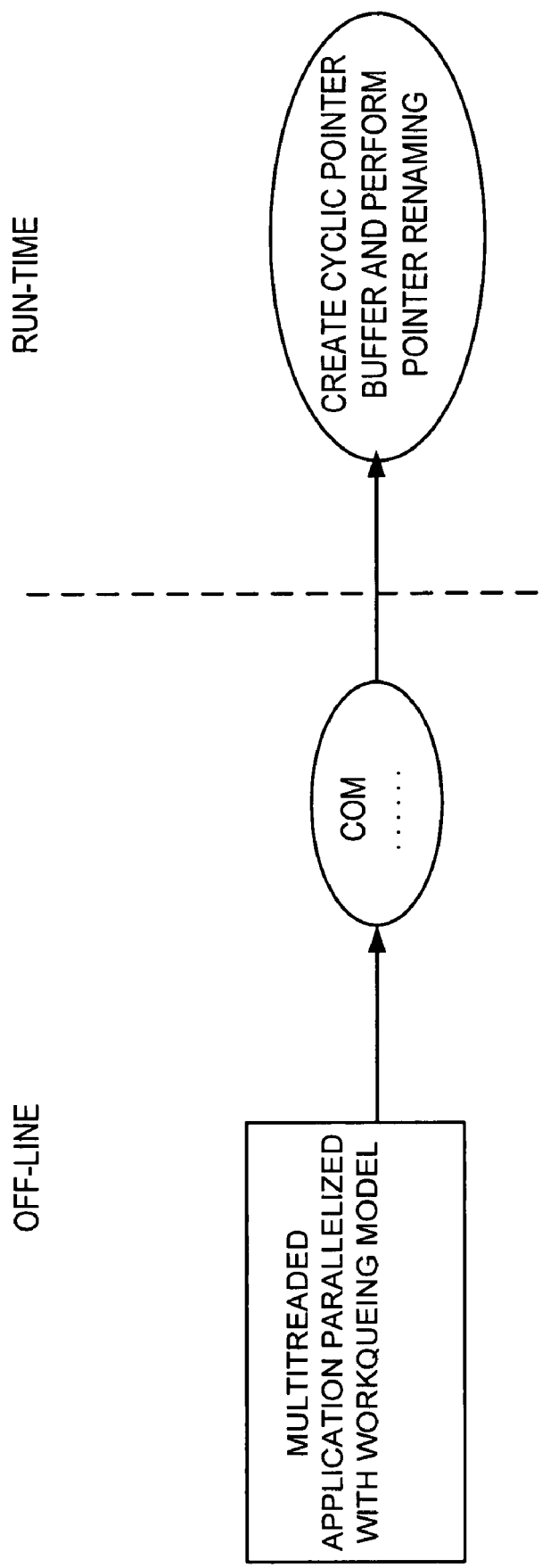
FIG. 7 illustrates an example workflow diagram for a fast argument passing via pointer renaming multithreaded application, according to one embodiment.

FIG. 7 illustrates an example workflow diagram for a fast argument passing via pointer renaming multithreaded application. A multithreaded application is generated (e.g., FIG. 1, FIG. 2) and is compiled. The compiler identifies the heap variables, their data type, and the first use and last use among these variables. The first and last use is determined by performing a data dependence analysis. The compiler then passes this information (hint information) to a runtime library. At runtime, at the moment of task queue creation, the runtime library captures the hint information passed from compiler to create a cyclic pointer buffer (e.g., FIG. 3, FIG. 4) and manages the pointer renaming during execution.

The cyclic pointer buffer is shared among all threads (including master and slave threads) and the frequent access to this shared central resource may cause high synchronization overhead on large number of processors, which will reduce the effectiveness of pointer renaming mechanism.

According to one embodiment, synchronization overhead associated with a centralized shared pointer buffer can be reduced by implementing a distributed pointer buffer scheme. The distributed pointer buffer scheme includes several pointer buffers being created, and only a small number of threads can access each pointer buffer. This reduces the contention to the shared resource, which in turn decreases the synchronization overhead. As an example, a 16 thread application could have four buffers created with each buffer providing access to four threads. The master thread may distribute the pointer (e.g., decoded frames in FIG. 1) evenly into each buffer. Thus, there are at most four threads (one master and three worker threads) competing for a buffer (as opposed to 16), so the synchronization overhead is reduced.

If the workload of a distributed buffer varies dramatically, the workload is imbalanced. Workload imbalance in a multi-threaded application may be reduced by implementing a work stealing strategy. The work stealing strategy entails an idle processor taking tasks from a busy processor. If a current pointer buffer is empty, then runtime library will steal a valid pointer element from another random selected pointer buffer and execute work on this stolen data on an idle physical processor. For example, the computation of feature extraction in a video mining application (e.g., FIG. 1) is dependent on the decoded frames, and its execution time changes dynamically for different frames so that one buffer may become empty prior to the others.

Figure 8:
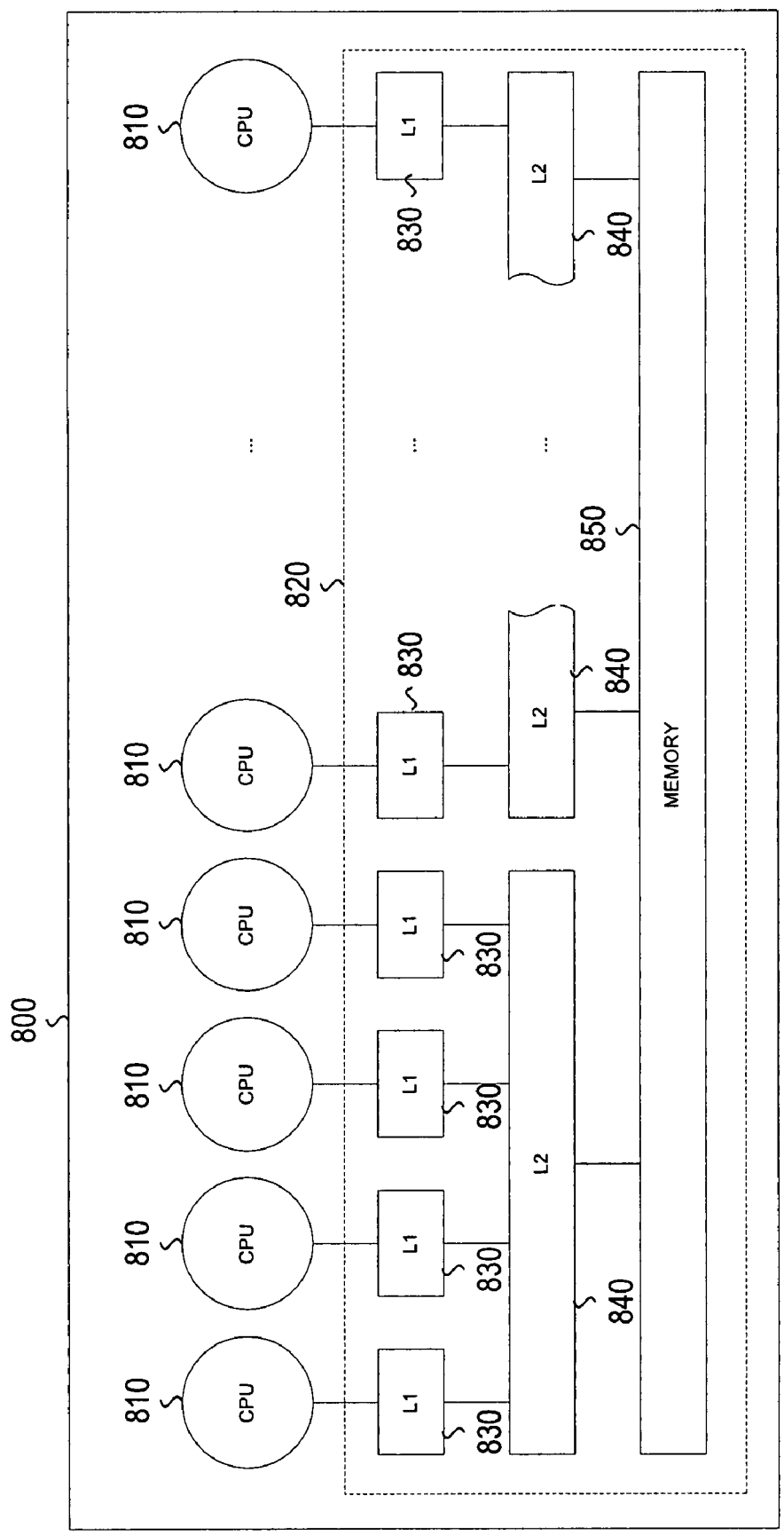
FIG. 8 illustrates a block diagram of an example SMP system, according to one embodiment.

FIG. 8 illustrates a block diagram of an example SMP system 800. The system 800 includes a plurality of CPUs 810 and a shared memory hierarchy 820. The memory hierarchy 820 may include a first level cache 830 associated with each CPU 810, a second level cache 840 associated with a group (e.g., four) of CPUs 810, and shared memory 850. The CPUs 810 may be used to execute instructions that effectively perform the software routines that are executed by the computing system 800. The CPUs 810 may be used run the multi-threaded applications where different CPUs 810 are running different threads. The SMP system 800 may be implemented on a single integrated circuit (IC) in which each CPU 810 is a separate core on the IC.

The task queue and the cyclic pointer buffer (e.g., FIG. 3, FIG. 4) may be stored in the shared memory 850. In the distributed buffer embodiment, a distributed cyclic pointer buffer may be stored in the shared second level cache 840 with the CPUs 810 sharing the second level cache 840 being the ones (the threads) able to have access thereto. The task queue may also be distributed and the distributed task queue may be stored in the shared second level cache 840.

Data locality is an important factor affecting the performance of parallel programs running on SMP and CMP systems. A good balance scheme should evenly distribute the workload among available CPUs 810 and locate the task being performed by a processor (thread) close to the data that the task will be performed on in order to reduce the communication and idle time. That is, it is beneficial to have one thread (e.g., slave thread) running on one physical CPU 810 perform computation on data produced by another thread (e.g., master thread) running on a physical CPU 810 sharing memory therewith. For example, if the first CPU in FIG. 8 is a master thread (e.g., video decoding) the next three CPUs that share L2 cache 840 therewith could be the slave threads (e.g., feature extraction).

In addition for the work stealing strategy discussed above, it is good for performance if an idle CPU 810 steals data from a pointer buffer sharing cache 840 with the idle CPU. For example, if the first and second CPU in FIG. 8 share a distributed buffer and the third and fourth CPUs share a second distributed pointer buffer and the first CPU is idle and the first pointer buffer is empty the first pointer buffer should steal a task from the second pointer buffer that is in the same cache 840 rather that another pointer buffer that is not contained in the shared cache 840. In systems with shared memory architecture (e.g., SMP, CMP), it is beneficial to communicate data between threads though low latency shared cache (e.g., 840) instead of long latency memory (e.g., 850). Additionally, the coherence overhead is also reduced by utilizing the shared cache.

Since the number of processors and cache organization (e.g., number of levels, cache size, private or shared) can be determined at runtime, the runtime library can schedule the task close to the data to preserve the data locality.

Various embodiments were described above with specific reference made to the OpenMP parallel processing language. The various embodiments are in no way intended to be limited thereto but could be applied to any parallel programming language (e.g., CILK, TBB) without departing from the current scope. The compilers and libraries associated with any parallel programming language could be modified to incorporate a pointer renaming scheme for fast argument passing.

The various embodiments were described with respect to multiprocessor systems with shared memory (e.g., SMP, CMP) but are not limited thereto. The various embodiments can be applied to any system having multiple parallel threads being executed and a shared memory amongst the threads without departing from the scope. For example, the various embodiments may apply to systems that have a plurality of microengines that perform parallel processing of threads.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A method to be performed by a processor during runtime, the method comprising
    initializing a queue for a master thread;
    creating a cyclic pointer buffer associating pointers to heap variables defined in the master thread, wherein size of the cyclic pointer buffer is based on size of the queue, and wherein each entry in the cyclic pointer buffer has a status associated therewith that is initially indicated as available for assignment;
    processing the master thread and saving data to a location in memory identified by the pointer associated therewith;
    enqueuing a slave thread;
    selecting a first entry in the cyclic pointer buffer that has the available for assignment state;
    exchanging the pointer for the master thread with a pointer for the first entry in the cyclic pointer buffer; and
    indicating the status for the first entry in the cyclic pointer buffer as available for processing.

2. The method of claim 1, further comprising
    initiating processing of the slave thread using the pointer associated therewith in the cyclic pointer buffer after the exchanging; and
    indicating the status of the first entry in the cyclic pointer buffer as in use.

3. The method of claim 2, further comprising
    completing processing of the slave thread; and
    indicating the status of the first entry in the cyclic pointer buffer as available for assignment.

4. The method of claim 1, wherein the cyclic pointer buffer has same number of entries as the queue.

5. The method of claim 1, wherein the cyclic pointer buffer has at least as many entries as available threads.

6. The method of claim 1, wherein the processing the master thread, the enqueuing a slave thread, the selecting a first entry in the cyclic pointer buffer, the exchanging the pointer, and the indicating the status are performed repeatedly by a first thread.

7. The method of claim 6, further comprising stopping the execution of the master thread when the cyclic pointer buffer has no entry indicated as available for assignment.

8. The method of claim 7, further comprising
    saving the pointer for the master thread; and
    initiating processing of a next slave thread using the first thread that was processing the master thread, wherein the processing of the next slave thread uses the pointer associated with a first entry in the cyclic pointer buffer indicated as available for processing.

9. The method of claim 8, further comprising
    determining the cyclic pointer buffer indicates an entry as available for assignment;
    exchanging the pointer for the master thread that was saved with a pointer for the entry in the cyclic pointer buffer; and
    indicating the status of the entry in the cyclic pointer buffer as available for processing.

10. The method of claim 9, further comprising
    initiating processing of the master thread using a second thread that was previously processing a slave thread; and
    indicating the status of the entry in the cyclic pointer buffer as in use.

11. The method of claim 1, wherein the exchanging the pointer includes renaming the pointer for the master thread as the pointer for the first entry and vice versa.

12. A non-transitory machine readable storage medium comprising content, which, when executed by a machine causes the machine to:
    compile a workqueing parallel programming application; and
    execute the workqueing parallel programming application including
        initializing a queue for a master thread;
        creating a cyclic pointer buffer associating pointers to heap variables defined in the master thread, wherein size of the cyclic pointer buffer is based on size of the queue, and wherein each entry in the cyclic pointer buffer has a status associated therewith that is initially indicated as available for assignment;
        processing the master thread and saving data to a location in memory identified by the pointer associated therewith;
        enqueuing a slave thread;
        selecting a first entry in the cyclic pointer buffer that has the available for assignment state;
        exchanging the pointer for the master thread with a pointer for the first entry in the cyclic pointer buffer; and
        indicating the status for the first entry in the cyclic pointer buffer as available for processing.

13. The machine readable storage medium of claim 12, wherein the content causing the machine to execute further includes
    indicating the status of the first entry in the cyclic pointer buffer as in use after processing of the slave thread is initiated using the pointer associated therewith in the cyclic pointer buffer after the exchanging; and
    indicating the status of the first entry in the cyclic pointer buffer as available for assignment after processing of the slave thread is completed.

14. The machine readable storage medium of claim 13, wherein the content causing the machine to execute further includes stopping the execution of the master thread when the cyclic pointer buffer has no entry indicated as available for assignment;

saving the pointer for the master thread; and initiating processing of a next slave thread using a first thread that was processing the master thread, wherein the processing of the next slave thread uses the pointer associated with a first entry in the cyclic pointer buffer indicated as available for processing.

15. The machine readable storage medium of claim 14, wherein the content causing the machine to execute further includes determining the cyclic pointer buffer indicates an entry as available for assignment;

exchanging the pointer for the master thread that was saved with a pointer for the entry in the cyclic pointer buffer;

indicating the status of the entry in the cyclic pointer buffer as available for processing;

initiating processing of the master thread using a second thread that was previously processing a slave thread; and indicating the status of the entry in the cyclic pointer buffer as in use.

16. The machine readable storage medium of claim 12, wherein the content causing the machine to compile includes identifying heap variables in arguments being passed from the master thread to the slave threads;

determining first use and last use of the heap variables in the slave threads through data dependence analysis;

inserting a first instruction set to mark a pointer as a logic pointer before the first use of the heap variables in the slave threads; and inserting a second instruction that a physical pointer is available for writing new data into associated memory after the last use of heap variables in the slave threads.

17. A system comprising a multicore processor;

memory coupled to the processor to store a workqueing parallel programming application with pointer renaming, the application when executed causing the processor to initialize a queue for a master thread;

create a cyclic pointer buffer associating pointers to heap variables defined in the master thread, wherein size of the cyclic pointer buffer is based on size of the queue, and wherein each entry in the cyclic pointer buffer has a status associated therewith that is initially indicated as available for assignment;

process the master thread and saving data to a location in memory identified by the pointer associated therewith;

enqueue a slave thread;

select a first entry in the cyclic pointer buffer that has the available for assignment state;

exchange the pointer for the master thread with a pointer for the first entry in the cyclic pointer buffer; and indicate the status for the first entry in the cyclic pointer buffer as available for processing.

18. The system of claim 17, wherein the application when executed further causes the processor to indicate the status of the first entry in the cyclic pointer buffer as in use after processing of the slave thread is initiated using the pointer associated therewith in the cyclic pointer buffer after the exchanging; and indicate the status of the first entry in the cyclic pointer buffer as available for assignment after processing of the slave thread is completed.

19. The system of claim 18, wherein the application when executed further causes the processor to stop the execution of the master thread when the cyclic pointer buffer has no entry indicated as available for assignment;

save the pointer for the master thread; and initiate processing of a next slave thread using a first thread that was processing the master thread, wherein the processing of the next slave thread uses the pointer associated with a first entry in the cyclic pointer buffer indicated as available for processing.

20. The system of claim 19, wherein the application when executed further causes the processor to determine the cyclic pointer buffer indicates an entry as available for assignment;

exchange the pointer for the master thread that was saved with a pointer for the entry in the cyclic pointer buffer;

indicate the status of the entry in the cyclic pointer buffer as available for processing;

initiate processing of the master thread using a second thread that was previously processing a slave thread; and indicate the status of the entry in the cyclic pointer buffer as in use.

* * * * *